UNITED STATES PATENT OFFICE.

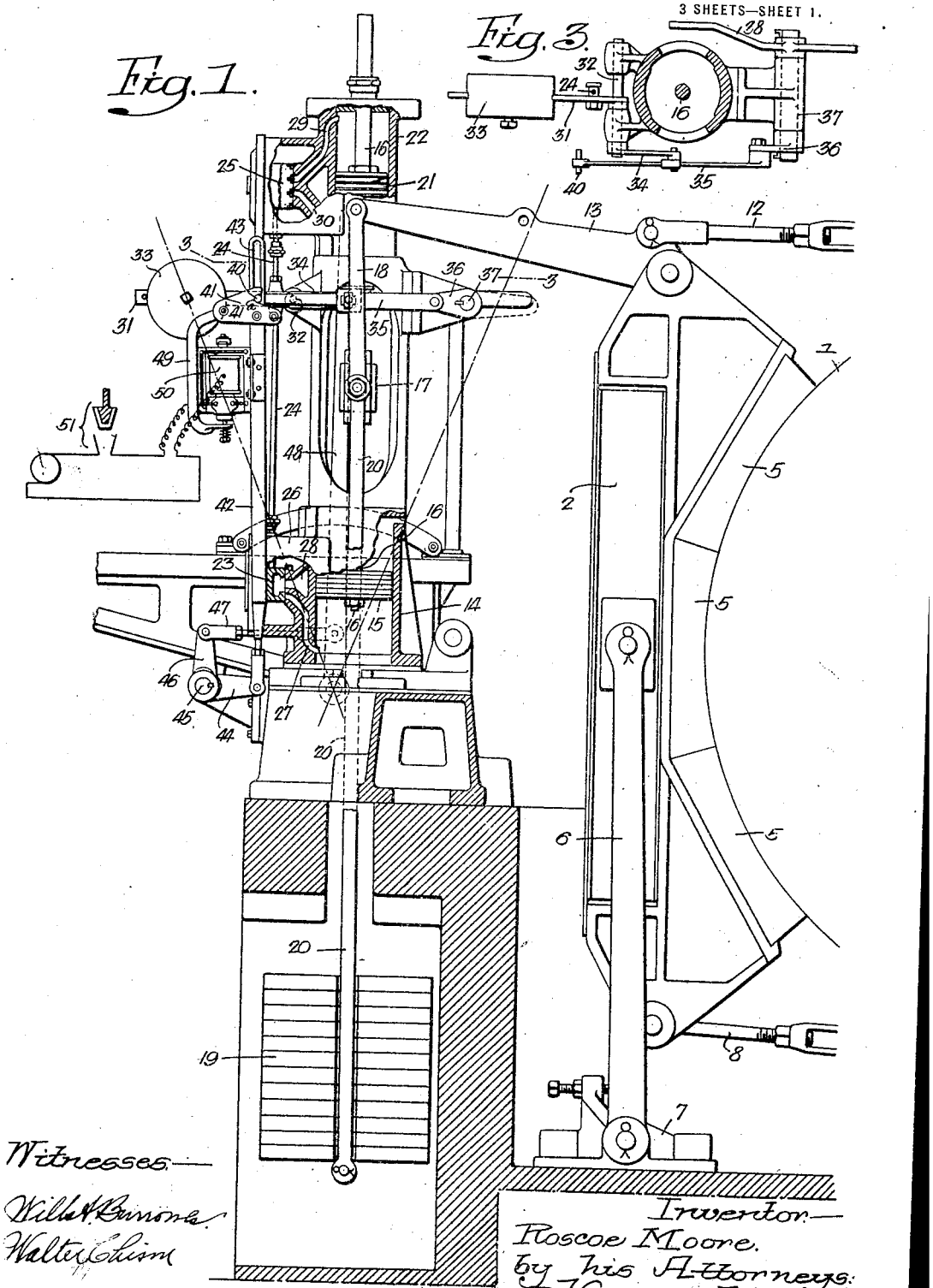

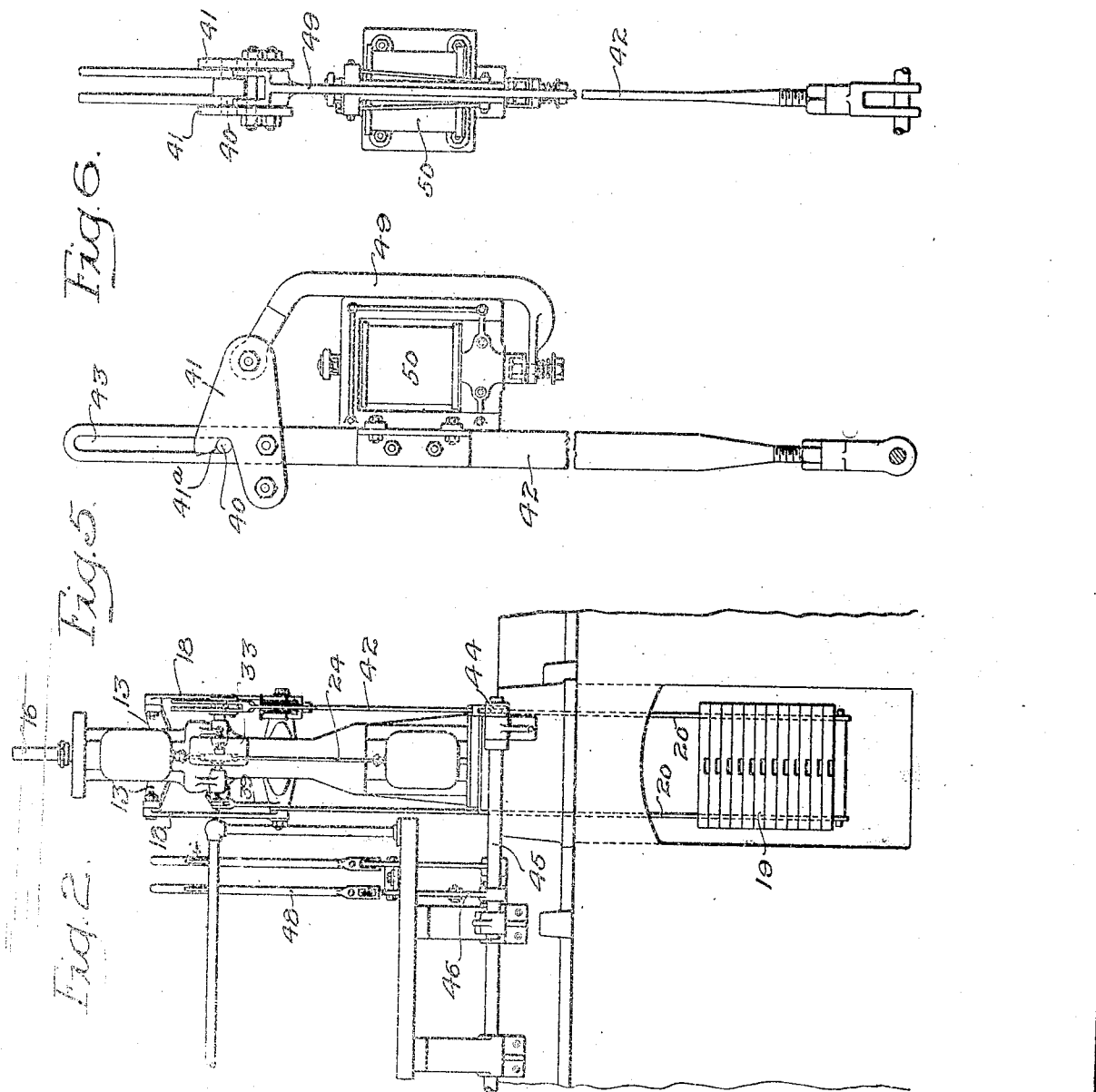

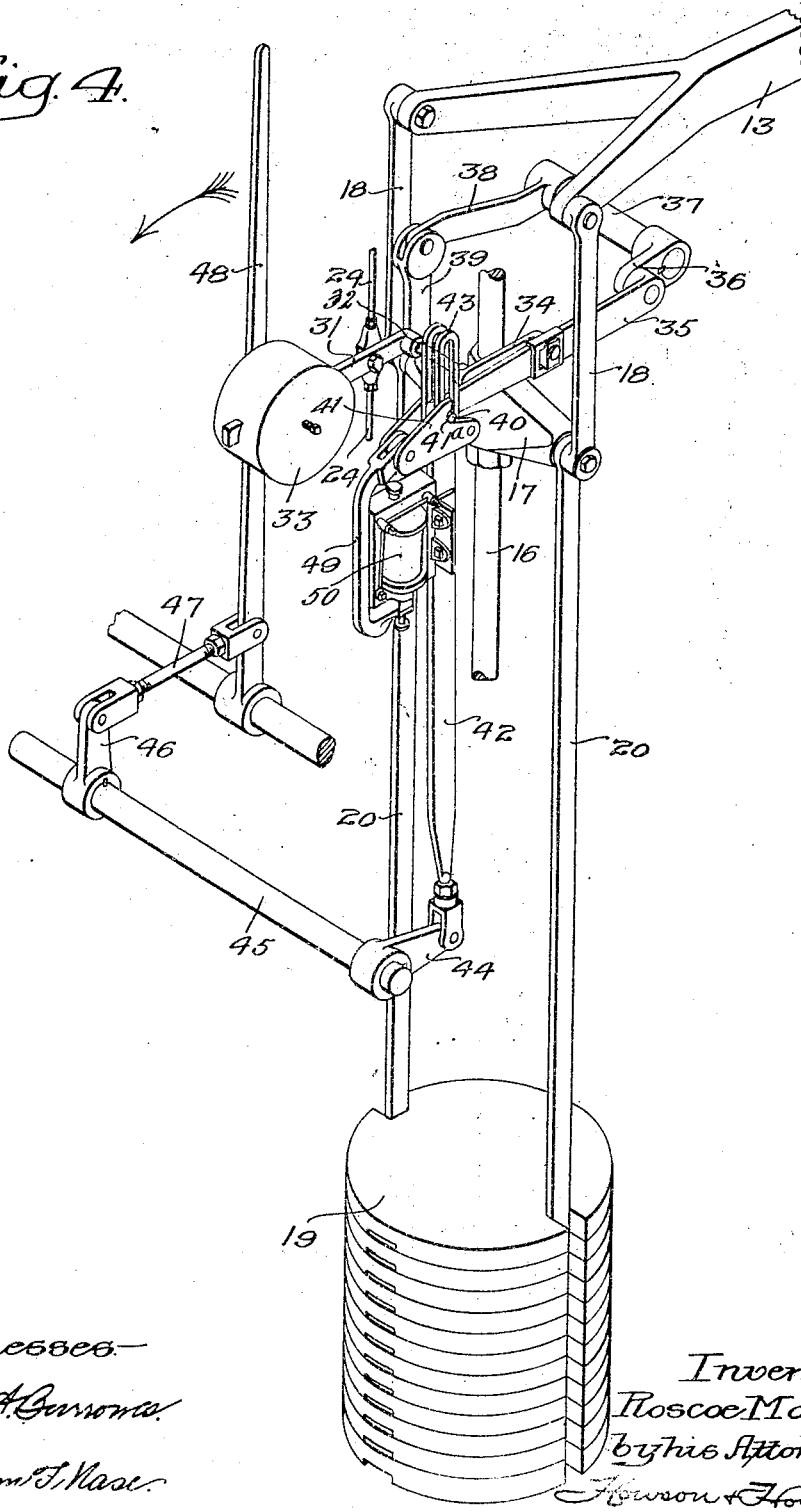

ROSCOE MOORE, OF WILKES-BARRE, PENNSYLVANIA

BRAKE MECHANISM.

1,284,129.  Specification of Letters Patent.  Patented Nov. 5, 1918.

Application filed March 28, 1914. Serial No. 827,943.

*To all whom it may concern:*

Be it known that I, ROSCOE MOORE, a citizen of the United States, residing in Wilkes-Barre, county of Luzerne, State of Pennsylvania, have invented certain Improvements in Brake Mechanism, of which the following is a specification.

My invention relates to that class of hoisting or haulage systems equipped with a brake engine having either a weight or an air operated actuating device and also provided with apparatus for preventing overtravel, overspeed or other abnormal movement of the cable drum.

One object of the invention is to provide a simple and effective system of the above type, whereby the holding brake is automatically and quickly applied without interfering with the operator's lever and without the employment of auxiliary valves or by-passes other than those ordinarily used in the service application of the brake, the invention including a novel form of electromagnetically controlled device for connecting the valve or valves with the apparatus for governing the same, together with positive means whereby the holding brake is prevented from accidental release in case the operator is not at his levers when the circuit of the electromagnet employed is completed after it has once been broken.

Another object of the invention is to provide a system of the above noted type with an electromagnetic controlling device of relatively small size and capacity which shall be so mounted and connected that none of the thrust or pull of the associated connecting elements shall come on the movable element of the electromagnet, which under operating conditions is so designed as to be lifted by the operator's lever.

These objects and other advantageous ends I secure as hereinafter set forth, reference being had to the accompanying drawings, in which:

Figure 1 is a side elevation, to some extent diagrammatic, illustrating my invention as applied to a well known form of brake mechanism;

Figs. 2 and 3 are respectively a front elevation and a horizontal section of the apparatus shown in Fig. 1, the latter being taken on the line $a$—$a$.

Fig is a perspective view illustrating in detail the arrangement of certain of the mechanism forming part of the invention; and Figs. 5 and 6 are respectively a side and a front elevation on an enlarged scale showing the detail construction of the solenoid and certain of its associated parts.

In the above drawings, 1 represents a drum or any other rotary member whose revolution is to be checked or stopped, and this has a more or less extended cylindrical surface on which in the present instance is operative a brake having two oppositely placed frames of which one is shown at 2 as having a plurality of brake shoes 5, and supported by a pair of links 6 pivoted to a supporting structure 7, so that said links and their shoes are free to swing toward and from the surface of the drum.

The upper end of the frame 2 carries an operating lever 13 having connected to it a link 12 leading from the second brake frame (not shown) which is also connected to the lower end of said part 2 by a link 8.

For operating the brake, I provide a suitable engine, such, for example, as a cylinder 14 having a piston 15 provided with a piston rod 16, which in turn is connected through a cross-head 17 and a pair of links 18 to the forked end of the brake operating lever 13. From the cross-head 17 is hung a relatively heavy weight 19 by means of a pair of links 20 and the upper end of the piston rod 16 has fixed to it a piston 21 operative in a cylinder 22 which with the valve mechanism hereafter described constitutes an oil cataract for locking the piston rod 16 and its attached parts in any given position.

In the present instance the admission of motive fluid to the brake engine cylinder 14 is controlled by a slide valve 23 connected to an operating rod 24 also connected to a valve 25, whereby communication between the two ends of the oil cataract cylinder 22 may be established or cut off. In the present instance, the engine cylinder 14 is so constructed that when the valve 23 is in its mid position the flow of motive fluid from the supply chest 26 is prevented and the port 27 leading from the lower end of said cylinder to the interior of the said chest is also closed off from the exhaust 28. If said valve 23 is moved upwardly, motive fluid is admitted from the chest 26 through the port 27 into the bottom of the cylinder, while if said valve be moved downwardly this port is placed in communication with the exhaust passage 28. In either case, any movement of the valve 23 from its mid position so operates the valve 25 as to permit of communication between the two ends of the oil cataract cylinder 22, which with its ports 29 and 30 is filled with oil or other suitable liquid.

For causing operation of the two valves 23 and 25 at will, I pivot the valve rod 24 to a lever 31, one end of which is fixed to a spindle 32 carried in a suitable bearing on the frame of the machine, while on the other end of said lever I mount a weight 33. Also fixed to the spindle 32 is an arm 34 pivotally connected to a bar 35 constituting a floating lever, one end of which is pivoted to a lever arm 36 fixed to a spindle 37 carried in bearings on the frame, and also having fixed to it an arm 38 connected through a link 39 with the cross-head 17. The opposite end of the floating lever is provided with a pin 40 projecting on both of its sides and designed for detachable engagement with a hook 41 pivoted to a reach rod 42 adjacent one end thereof, the pin 40 being slidable in a vertically extending slot 43 in the upper end of said rod. The lower end of the latter is pivoted to an arm 44 fixed on a shaft 45, also having fixed to it a second arm 46 connected through a link 47 with the operator's lever 48.

It will be noted that the hook 41 projects on one side of the reach rod 42, so as to engage and be turned on its pivot by the floating lever 35 under certain conditions, while the opposite end of said hook is connected through a bar 49 with the core of a solenoid or electromagnet 50. This latter is in circuit with a suitable source of current and with one or more switches so placed as to be operated, for example, when the drum 1 has made more than a predetermined number of revolutions or when its speed exceeds a certain predetermined amount. The arrangement of parts is such that the weight 19 acting through the links 20 and 18 tends to move the lever 13 and apply the brake shoes 5 to the drums, this condition existing except when the said lever 13 is moved upwardly by power applied to the piston 15 of the brake engine cylinder 14.

When it is desired to put the apparatus in operation, the operator moves the lever 48 in the direction of the arrow, Fig. 4, thus raising the reach rod 42 and with it the hook 41, until the projecting end of this latter engages the floating lever 35, under which conditions the pin 40 of said lever is immediately in front of the recess 41ᵃ of said hook which is designed for its reception. If the circuit of the solenoid be completed, as by closing the switch 51, its core is drawn up and with it the connecting rod 49, thus swinging the hook 41 on its pivot so that it operatively engages the pin 40 of the floating lever and connects the floating lever with the reach rod. Thereafter, if the operator's lever 48 be moved in a direction opposite that indicated by the arrow, Fig. 4, the reach rod 42 moves downwardly the pin-carrying end of the floating lever 35. As a result, the arm 34 is lowered and the arm 31 is raised together with the valve rod 24.

Such movement of the latter so moves the valve 25 as to establish communication between the two ends of the cataract cylinder 22 and also permits fluid under pressure to pass from the supply chest 26 through the port 27 into the lower end of the cylinder 14, so that the piston 15 is moved upwardly. The rod 16 with the cross-head 17 is also moved up and through the link 39, arms 38 and 36, the second end of the floating lever 35 is raised, said lever turning on the pin 40 as a fulcrum. Such movement is transmitted through the arm 34, spindle 32 and rod 24, and in restoring the valve 23 to its mid or neutral position, cuts off the connection between the two ends of the cataract cylinder, so that further movement of the parts is prevented.

The previously noted upward movement of the piston rod 16 raised the end of the operating lever 13 against the action of the weight 19, thus slacking off the brake shoes and permitting the drum 1 to rotate more or less freely. Obviously, the movement of the piston 15 and the amount of raising of the end of the lever 13 may be adjusted with the greatest nicety owing to the action of the floating lever 35, so that the brake may be slacked off to a greater or less extent depending upon the amount of movement given the main operating lever 48.

With the parts in the above described positions, i. e., with the brake released, if the current supply to the solenoid should be cut off by reason of the opening of the switch 51 because of overtravel or excessive speed of the drum, the hook 41 will be immediately turned on its pivot and release the pin 40, which under the action of the weight 33 will turn on the pivot connecting it to the arm 36 and allow the valve rod 24 to move down. The lower end of the brake cylinder 14 is thus at once placed in communication with the exhaust passage 28 through the port 27 and valve 23 and communication is simultaneously established between the two ends of the cataract cylinder, which therefore permits a downward movement of the cross-head 17 and lever 13 under the action of the weight 19 which thus applies the brake to the drum 1.

In order to again operatively connect the parts, the lever 48 is moved in the direction of the arrow, Fig. 4, to cause the hook 41 to be brought adjacent the pin 40, whereupon the closing of the circuit of the solenoid 50 causes said hook 41 to turn on its pivot and engage the pin 40.

The weight 33 is so proportioned and adjusted that it practically balances the weight of the solenoid 50 and its attached parts, which as shown are preferably, though not necessarily carried on the reach rod 42.

As a result of this construction, the operator's lever will remain in any position in which it is placed, although when the latch formed by the hook is disengaged from the floating lever, the weight 33 immediately becomes operative to move the valve 23 to such a position as will permit the brake to automatically set. After the disconnection of the hook from the floating lever, the weight of the solenoid would tend to move the operating lever 48 into its forward position, although if such lever were held by the operator at the instant the hook disengaged it would then remain wherever it was held, the brake setting independently of such position.

Obviously, the detail construction of the hook or latch mechanism is immaterial, since it can be made to disconnect the valve mechanism from the operating lever, although of widely different form, without departing from my invention. Since the main function of the solenoid is merely that of swinging the hook on its pivot, it may be of relatively small size and capacity, requiring but little current for its operation, especially since the work incident on reconnecting the parts after the hook has released the floating lever, is done for the most part by the operator in raising the solenoid core and hook into a position from which the latter at once swings on its pivot into engagement with the pin 40 of the floating lever when the solenoid circuit is completed.

I claim:—

1. The combination of a valve mechanism; means for controlling said valve mechanism including an electro-magnetically actuated latch; and speed responsive apparatus adapted to cause operation of said latch to disconnect said controlling means from the valve mechanism under predetermined conditions.

2. The combination of a valve mechanism; hand-operated means for controlling said valve mechanism including an electro-magnetically actuated member; an electro-magnet for operating said member to disconnect said means from the valve mechanism under predetermined conditions, the controlling means including an element adjustable at will to a position to coöperate with the electro-magnetically actuated member.

3. The combination of a valve mechanism; manually operative means for controlling said mechanism including a coupling of which one element is movable at will into a definite position; an electromagnet for actuating the other element of said coupling when said first element occupies said position, to establish an operative connection between the valve mechanism and the operating means; with a limit switch in circuit with the electromagnet.

4. The combination of a limit switch placed to be actuated under predetermined conditions; valve mechanism; a hand-operated member for governing the operation of said valve mechanism; and means for connecting said member with the valve mechanism including an electro-magnetic latch having windings in circuit with said switch.

5. The combination of valve mechanism; an operating member for controlling said mechanism; means connecting said member with the valve mechanism and including a floating lever; a latch detachably engaging said lever; with electro-magnetically controlled means for operating the latch at will.

6. The combination of valve mechanism; an operating member; means connecting said member and the valve mechanism including a floating lever and a latch separably connecting said lever to the operating member; a weight operative to move the floating lever with the valve mechanism to a predetermined position; and electro-magnetic means for actuating the latch, said means being mounted to normally neutralize the effect of the weight.

7. The combination of valve mechanism; an operating member for said mechanism; means including a hook adjustable at will by said member for detachably connecting said member and the mechanism; and an electro-magnetic device for controlling the hook.

8. The combination of valve mechanism; an operating lever; means connecting said operating lever and the valve mechanism, including a link, a floating lever and a latch carried by the link in position to detachably engage the floating lever; with an electromagnet mounted on the link for actuating the latch.

In testimony whereof, I have signed my name to this specification, in the presence of two subscribing witnesses.

ROSCOE MOORE.

Witnesses:
L. F. MILTEN,
J. M. GREGORY.